United States Patent
Faerber

Patent Number: 6,060,687
Date of Patent: May 9, 2000

[54] METHOD OF LASER CUTTING METAL WORKPIECES

[75] Inventor: Mark Faerber, Hamburg, Germany

[73] Assignee: AGA Aktiebolag, Sweden

[21] Appl. No.: 09/142,953

[22] PCT Filed: Mar. 3, 1997

[86] PCT No.: PCT/EP97/01051

§ 371 Date: Sep. 15, 1998

§ 102(e) Date: Sep. 15, 1998

[87] PCT Pub. No.: WO97/34730

PCT Pub. Date: Sep. 25, 1997

[30] Foreign Application Priority Data

Mar. 15, 1996 [DE] Germany .............. 196 10 298

[51] Int. Cl.[7] .............................................. B23K 26/12
[52] U.S. Cl. .................... 219/121.84; 219/121.72; 219/121.67; 219/121.65; 219/121.66; 219/121.6
[58] Field of Search ................... 219/121.84, 121.72, 219/121.67, 121.65, 121.66, 121.6

[56] References Cited

U.S. PATENT DOCUMENTS 5,380,976  1/1995  Couch, Jr. et al. ............... 219/121.44
5,578,228  11/1996  Beyer et al. ..................... 219/121.72

FOREIGN PATENT DOCUMENTS

| 4123716 | 1/1993 | Germany . |
| 2030389 | 1/1990 | Japan . |
| WO 94/04306 | 3/1994 | WIPO . |
| WO 94/13424 | 6/1994 | WIPO . |

OTHER PUBLICATIONS

Preissig et al., "High speed laser cutting of thin metal sheets," SPIE 2207: 96–110 (1994).

Primary Examiner—Patrick Ryan
Assistant Examiner—M. Alexandra Elve
Attorney, Agent, or Firm—Medlen & Carroll, LLP

[57] ABSTRACT

The invention concerns a method for laser cutting metal workpieces which contain bound oxygen by using a mixture of ay least one inert gas and hydrogen as the cutting gas. The hydrogen protein of the cutting gas prevents oxygen which is from the metal during the cutting process from causing undesired oxidation in the region of the cutting point. The formation of burrs and furrows is thus prevented.

20 Claims, 1 Drawing Sheet

METHOD OF LASER CUTTING METAL WORKPIECES

RELATED APPLICATION DATA

This Application is a National Stage Application of PCT/EP97/01051 filed Mar. 3, 1997, and published as WO 97/34730. This Application claims priority to Federal Republic of Germany Application No. 196 10 298.7, filed Mar. 15, 1996.

FIELD OF THE INVENTION

The present invention relates to a process for the laser cutting of metal workpieces.

BACKGROUND OF THE INVENTION

During the laser cutting of metal workpieces, a laser beam is focused onto the workpiece which is to be cut. Often, a cutting gas is simultaneously blown onto the cutting location by means of a nozzle. The cutting gas is intended to protect the nozzle of the cutting installation and the focusing lens contained therein from metal spatter and slag formed during the cutting process and, at the same time, to assist with flushing the molten material and the slag out of the cutting kerf. In many cases, the cutting gas used is oxygen or an oxygen-containing gas mixture. The chemical reaction of the oxygen with the cut material (for example steel) produces additional heat which assists the cutting process. Steel combustion then takes place.

During laser cutting, the person skilled in the art distinguishes between conventional laser cutting with a cutting speed of at most 10 m/min and high-speed cutting of thin metal sheets with cutting speeds of up to 100 m/min (Preißig et al., High speed laser cutting of thin metal sheets, SPIE Vol. 2207, 96–110). In connection with high-speed cutting of thin metal sheets, it is already known from DE-A-4,123,716 to use a mixture of inert gas and hydrogen as the cutting gas. During high-speed cutting, the cutting speed is limited by so-called melt build-up phenomena. The high viscosity of the molten material which is formed during cutting limits the speed which can be achieved. DE-A4,123,716 teaches the person skilled in the art that the addition of hydrogen to the cutting gas reduces the surface tension of the molten material, thus counteracting a build-up thereof.

BRIEF SUMMARY OF THE INVENTION

The invention is based on the object of providing a process for laser cutting of metal workpieces which contain bonded oxygen that results in an untarnished and clean cut surface free of striation, burring or other contamination. This object is achieved according to the invention by the fact that a mixture of at least one inert gas and hydrogen is used as the cutting gas.

DETAILED DESCRIPTION OF THE INVENTION

Figure 1:
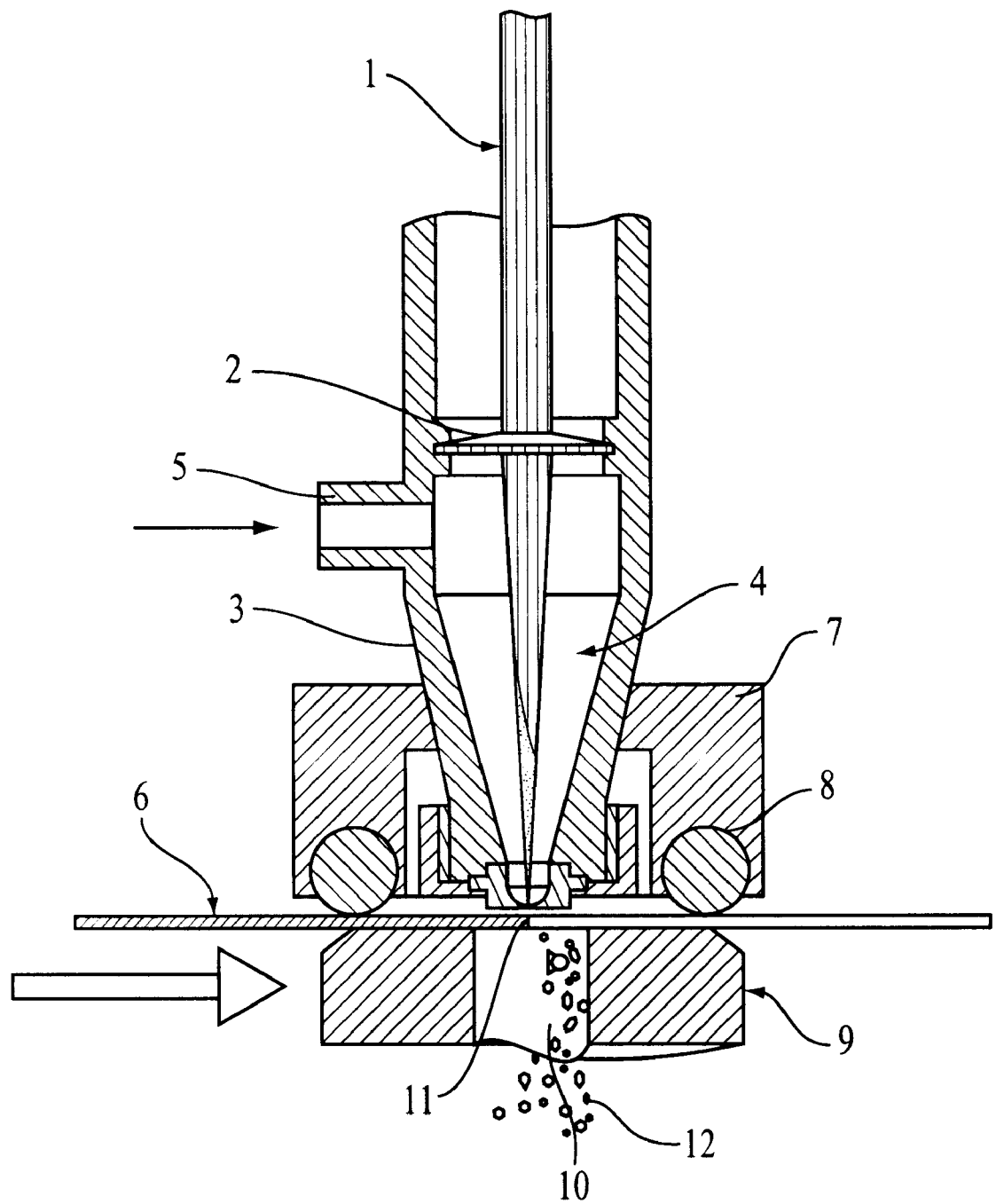

In the context of the invention, the term inert gas denotes any gas and any gas mixture which under the conditions which arise during cutting does not undergo any, or undergoes only slight, chemical reactions with the workpiece to be cut, the reaction products formed during cutting and/or the surrounding atmosphere. Inert gases which may be used are, for example, noble gases, nitrogen and mixtures thereof. Amongst the noble gases, argon is particularly preferred.

The term "metal workpieces which contain bonded oxygen" comprises all metals which contain chemically bonded oxygen of oxidation number II at least in partial areas (for example on the surface). Typical examples are metals which maintain their resistance to environmental effects by means of a layer of oxide on the surface (for example aluminum and its alloys).

The invention has recognized that, in the case of such metals, the cutting-gas mixture according to the invention makes it possible to avoid a cut which is not clean and tarnishing of the material which is to be cut. Surprisingly, the addition of hydrogen avoids or reduces these undesirable effects.

The bonded oxygen in the metal clearly leads to a cut which is not clean (burring, for example), to oxidation reactions in the region of the cut edge and to the metal becoming tarnished in the region of the cut edge. Even this cannot be deduced from the prior art, since this generally actually adds oxygen in order to improve the cutting capacity.

The invention is furthermore based on the recognition that this undesirable effect caused by the oxygen bonded in the metal can be avoided or reduced by adding hydrogen to a cutting gas which is otherwise inert. This is surprising to the extent that it would actually be expected that the oxygen, which during the cutting operation may be released from its bond with the metal and would then be liberated initially in the atomic state, would immediately react further in the metal matrix, leading to renewed oxidation reactions. Instead, it has been found that the affinity of this oxygen for hydrogen which is conveyed past the cutting location in molecular form is clearly higher and therefore the oxygen is bonded by the hydrogen and removed. This effect occurs even at relatively low concentrations of hydrogen in the cutting gas.

The technical effect of the addition of hydrogen in the context of the invention is therefore completely different from that exerted during the highspeed cutting of thin metal sheets in accordance with DE-A-4,123,716, where the desired effect of the hydrogen is merely to reduce the surface tension of the molten material in order to allow more rapid cutting.

The cutting gas expediently contains 1–30, preferably 3–25, more preferably 5–15% by volume of hydrogen.

It is particularly preferred to use the process according to the invention on metal workpieces which have a layer of oxide. In the context of the invention, the term "layer of oxide" is to be interpreted broadly and comprises all layers in which oxygen of oxidation number II is bonded in a crystal lattice. This may involve layers of oxides, hydroxides, carbonates, sulphates and mixtures thereof, for example. This term also includes layers of mixed crystals, such as for example spinels.

The workpieces may comprise aluminum or an aluminum alloy. Aluminum is known to be made inert immediately in air by the formation of a superficial layer of oxide. This layer of oxide is not a pure aluminum oxide, but generally also comprises mixed forms of oxides and hydroxides. In the case of aluminum alloys, mixed oxides, such as for example spinels, may also be formed on the surface.

The process according to the invention can be used particularly advantageously on workpieces made from anodized aluminum or an anodized aluminum alloy. In the case of anodized aluminum, the layer of oxide is artificially enhanced, (generally electrolytically). In the case of these materials, the process according to the invention improves the quality of cut to a particularly significant extent.

The cutting speed in the process according to the invention advantageously lies between 1 and 10 m/min. These are speeds which lie within the rang, of so-called conventional laser cutting. Depending, in particular, on the thickness of the material and the laser power, the cutting speed may also lie below 1 m/min.

EXEMPLARY EMBODIMENT OF THE INVENTION and DETAILED DESCRIPTION OF THE DRAWING An exemplary embodiment of the invention will now be described with reference to the drawing, which diagrammatically depicts the layout of significant components of a laser-cutting installation.

A laser beam 1 is directed by means of a focusing lens 2 onto the workpiece 6 which is to be cut. It passes through a nozzle 3 and its aperture 11. The laser itself is not shown in the drawing, and suitable lasers are commonly known to the person skilled in the art. By way of example, it is possible to use a $CO_2$ laser or a solid laser, such as for example a Nd:YAG laser. Suitable beam powers lie, for example, in the range from 1 to 2, preferably 1.5 kW. The focusing lens 2 preferably focuses the laser beam onto the underside of the workpiece (metal sheet) which is to be cut. The diameter of the opening of the nozzle aperture 11 may lie in the range from 0.8 to 1.5, preferably 1.2 to 1.5 mm. The distance between the nozzle aperture 11 and the surface of the workpiece 6 preferably lies in the range from 0.25 to 0.6 mm.

The nozzle 3 has a feed line 5 through which cutting gas is guided into a chamber 4. In this exemplary embodiment a $N_2/H_2$ mixture with a hydrogen content of 10% by volume is used as the cutting gas. The pressure of the cutting gas supplied lies between 10 and 15 bar.

The metal sheet 6 which is to be cut is supported on a bearing device 9 which has an opening 10 through which the metal residues and slag 12 produced during cutting can depart. The nozzle 3 is supported on the metal sheet 6 by means of a supporting device 7 which has ballbearings 8.

During cutting, the metal sheet 6 is guided through the cutting device in the direction of the arrow shown in FIG. 1 at a speed of 1 m/min. Oxygen which is chemically bonded in the metal and is liberated during cutting is bonded and removed by the hydrogen content in the cutting gas before undesirable oxidation reactions can occur in the region of the cutting location. Striation and burring in the region of the cutting location are avoided or reduced.

EXAMPLE

One example of use of the process according to the invention is the cutting of aluminum alloys, such as AlMg3 and AlMgSil with a material thickness of 2 mm. In the case of non-anodized sheets of these alloys, the process according to the invention improves the quality of cut significantly. This improvement is even more emphatic in the case of anodized sheets which have a thicker layer of oxide and in the surface regions of which more oxygen is bonded.

What is claimed is:

1. A method for the laser cutting of metal workpieces comprising:
    a) providing:
        i) a metal workpiece comprising bonded oxygen;
        ii) a laser cutting means;
        iii) a cutting gas comprising a mixture of at least one inert gas and hydrogen; and
    b) cutting said metal workpiece using said laser cutting means and said cutting gas.
2. The method of claim 1, wherein said cutting gas comprises about 1% to 30% by volume hydrogen.
3. The method of claim 2, wherein said cutting gas comprises about 3% to 25% by volume hydrogen.
4. The method of claim 3, wherein said cutting gas comprises about 5% to 15% by volume hydrogen.
5. The method of claim 1, wherein said inert gas is selected from the group consisting of helium, neon, argon, nitrogen, and combinations thereof.
6. The method of claim 5, wherein said cutting gas comprises about 1% to 30% by volume hydrogen.
7. The method of claim 6, wherein said cutting gas comprises about 3% to 25% by volume hydrogen.
8. The method of claim 7, wherein said cutting gas comprises about 5% to 15% by volume hydrogen.
9. The method of claim 1, wherein said metal workpiece comprises a surface layer of oxide.
10. The method of claim 1, wherein said metal workpiece comprises a metal selected from the group consisting of aluminum and aluminum alloys.
11. The method of claim 10, wherein said aluminum and said aluminum alloys are anodized.
12. The method of claim 1, wherein said cutting occurs at a rate between about 1 and 10 meters per minute.
13. The method of claim 1, wherein said cutting comprises cutting under conditions such that said oxygen in said metal workpiece is removed by said hydrogen in said cutting gas.
14. A method for the laser cutting of metal workpieces comprising:
    a) providing:
        i) a metal workpiece comprising bonded oxygen, said metal is selected from the group consisting of aluminum and aluminum alloys;
        ii) a laser cutting means;
        iii) a cutting gas; and
    b) cutting said metal workpiece using said laser cutting means and said cutting gas, wherein said cutting gas comprises a mixture of at least one inert gas and hydrogen under conditions such that said oxygen in said metal workpiece is removed by said hydrogen in said cutting gas.
15. The method of claim 14, wherein said cutting gas comprises about 1% to 30% by volume hydrogen.
16. The method of claim 15, wherein said cutting gas comprises about 3% to 25% by volume hydrogen.
17. The method of claim 15, wherein said cutting gas comprises about 5% to 15% by volume hydrogen.
18. The method of claim 14, wherein said inert gas is selected from the group consisting of helium, neon, argon, nitrogen, and combinations thereof.
19. The method of claim 14, wherein said metal workpiece is anodized.
20. The method of claim 14, wherein said cutting occurs at a rate between about 1 and 10 meters per minute.

* * * * *